United States Patent [19]

Glukhov

[11] Patent Number: 5,062,441
[45] Date of Patent: Nov. 5, 1991

[54] DRAIN VALVE USED IN AIRCRAFT

[75] Inventor: Michael Glukhov, Encino, Calif.

[73] Assignee: Sabre Industries, Inc., Burbank, Calif.

[21] Appl. No.: 541,529

[22] Filed: Jun. 21, 1990

[51] Int. Cl.$^5$ .......................... F16T 1/20; F16T 31/22
[52] U.S. Cl. .................................... 137/81.1; 137/192
[58] Field of Search ............................... 137/192, 81.1

[56] References Cited

U.S. PATENT DOCUMENTS

| | | | |
|---|---|---|---|
| 4,463,774 | 8/1984 | Gorges | 137/81.1 |
| 4,506,851 | 3/1985 | Gupta | 137/81.1 X |
| 4,715,561 | 12/1987 | Spinosa | 137/81.1 X |

*Primary Examiner*—Alan Cohan
*Attorney, Agent, or Firm*—Plante, Strauss, Vanderburgh and Connors

[57] ABSTRACT

Disclosed is a valve used in the water drainage system of an aircraft having a pressurized cabin. The valve includes a housing with a water inlet and outlet and in which a float is mounted by a spring. The float includes a stopper element adapted to engage the water outlet in the housing. The water inlet is in communication with the cabin pressure and the water being discharged and the outlet is in communication with atmospheric pressure outside the aircraft. The spring normally biases the float so that the stopper element is away from the water outlet when the plane is on the ground. As the plane gains altitude, the differential in pressure between atmospheric pressure and cabin pressure closes the valve, with the spring moving the stopper element into engagement with the water outlet. This occurs in response to the changing differential in pressure between the cabin pressure and atmospheric pressure. When water fills a space between the housing wall and the float, the float moves away from the outlet, lifting the stopper element from the water outlet and allowing the water to be discharged.

6 Claims, 3 Drawing Sheets

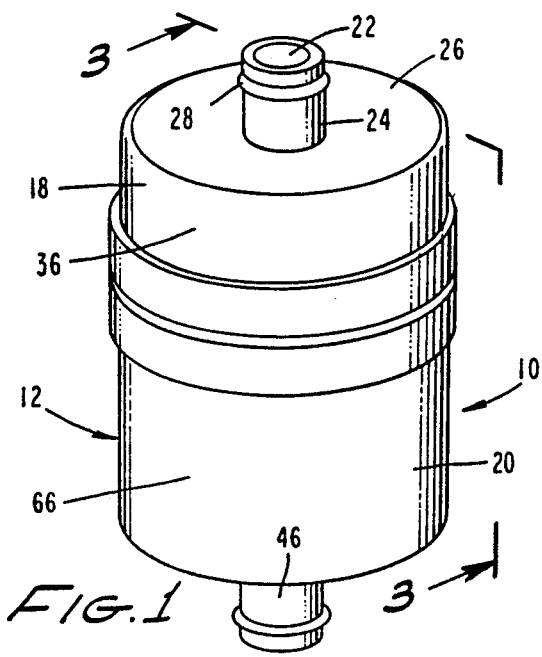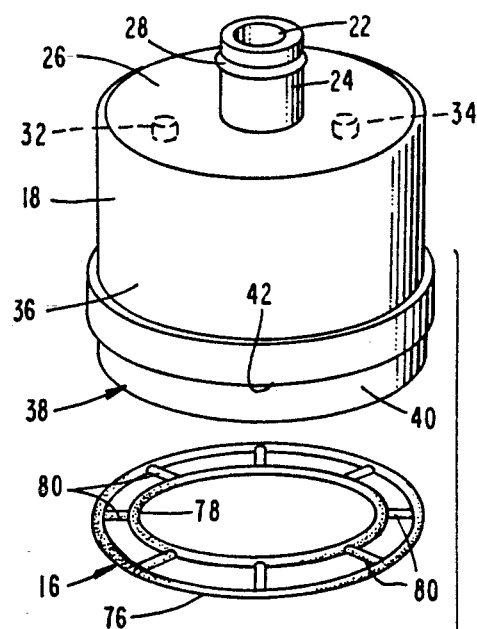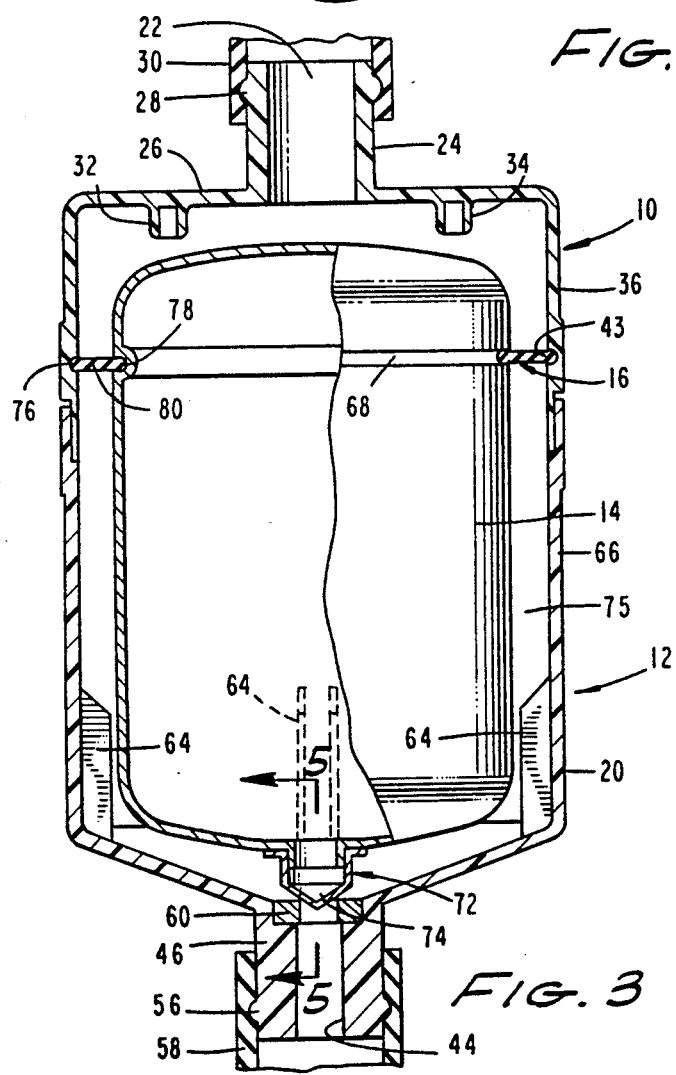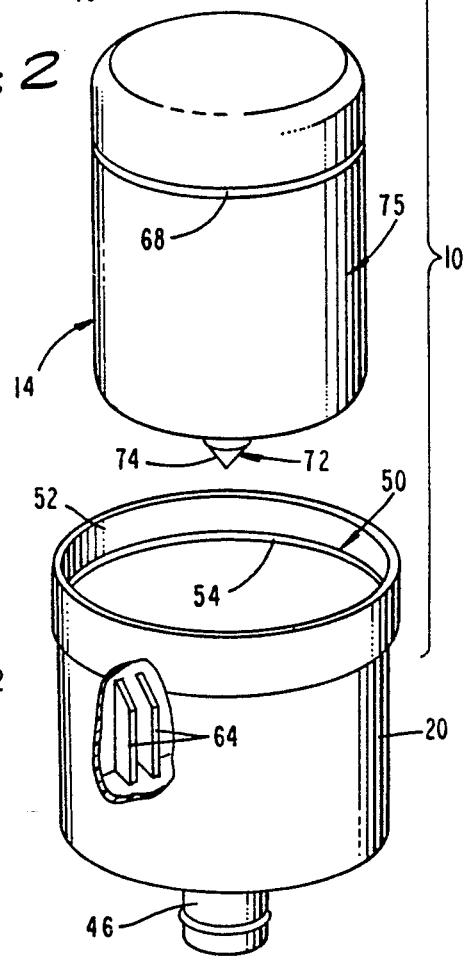

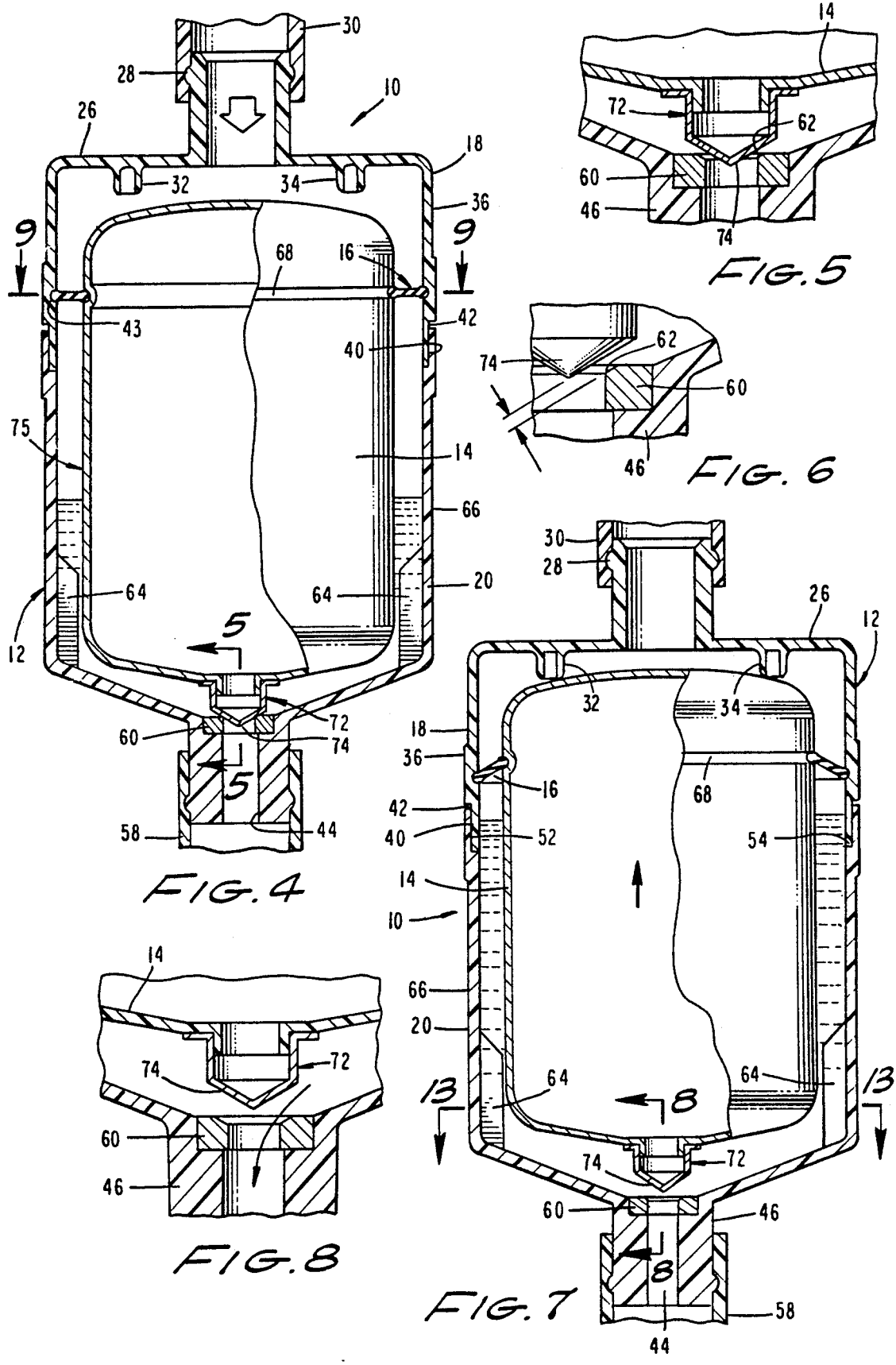

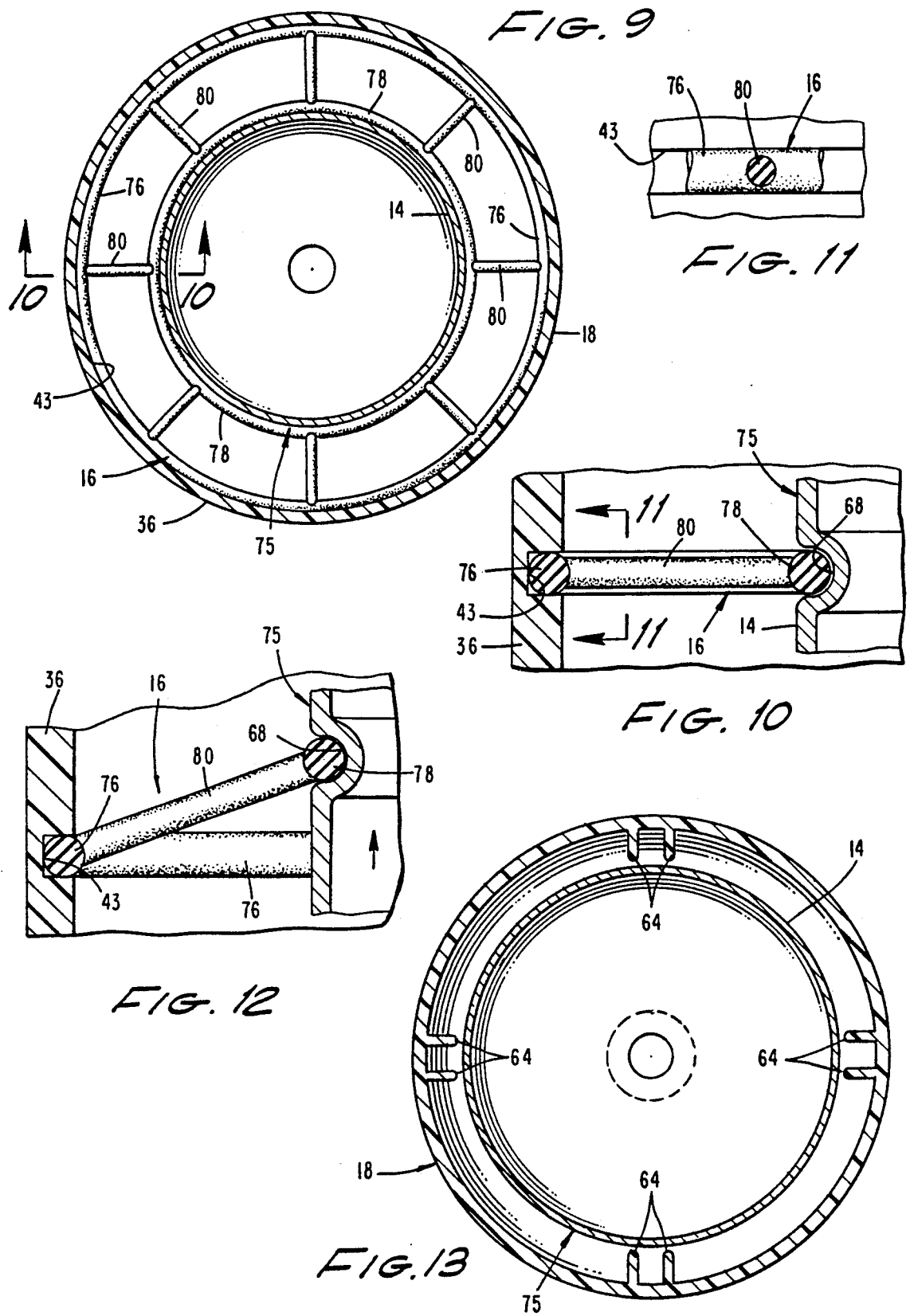

DRAIN VALVE USED IN AIRCRAFT

BACKGROUND DISCUSSION

1. Field of the Invention

This invention relates to drain valves used in aircraft. This drain valve normally is opened when the plane is on the ground, and in flight it automatically closes as the aircraft reaches a normal flying altitude. It opens when drain water is introduced into the valve and closes when drainage is complete.

2. Background Discussion

In large commercial aircraft, water is normally carried for both the crew and passengers. In flight this water is used for drinking and personal hygiene, and the waste water is discharged into the atmosphere. Normally, the cabin for crew and passengers is pressurized, and the discharge of the waste water must be done in a manner that minimizes loss of cabin pressure when the aircraft is at high altitudes. It is also desirable to insure that the drainage system for this water has been completely drained when the aircraft is on the ground to avoid the water freezing and clogging the drainage system with ice.

SUMMARY OF THE INVENTION

It is the objective of the present invention to provide a water drain valve for an aircraft designed to avoid loss of cabin pressure. This valve normally is opened when the aircraft is on the ground and, during flight, opens and closes depending on the water level in the valve and altitude of the aircraft.

The valve of this invention has several features, no single one of which is solely responsible for its desirable attributes. Without limiting the scope of this invention as expressed by the claims which follow, its more prominent features will now be discussed briefly. After considering this discussion, and particularly after reading the section of this application entitled, "DETAILED DESCRIPTION OF THE PREFERRED EMBODIMENT," one will understand how the features of this invention provide its advantages.

The first feature of this invention is that the drain valve includes a housing containing a water inlet and a water outlet. The housing will normally be in a vertical orientation when the aircraft is cruising at its normal flying altitude, with the outlet disposed below the inlet. Preferably, the outlet and inlet lie along the same vertical central axis of the housing.

The second feature is that the water inlet is in communication with the cabin pressure. It is also in communication with a source of water that periodically releases waste water to be discharged into the atmosphere. The water outlet is in communication with the atmosphere outside the aircraft. Consequently, when the aircraft is in flight, there is a differential in pressure between the inlet and outlet corresponding to the difference in pressure between the cabin pressure and the atmosphere pressure outside the aircraft. As the aircraft attains higher altitudes, this differential in pressure increases. As will be explained in greater detail subsequently, this differential in pressure results in the valve closing. When water fills the drain valve, periodic opening occurs.

The third feature of this invention is that there is a float member mounted in the housing by a spring which suspends the float. A stopper element at one end of the float member engages the water outlet and seals the outlet so that water entering the housing is retained in the housing. As water fills the housing, the float lifts the stopper element from the outlet. But the response of the float to the water filling the housing depends on the altitude of the aircraft.

The fourth feature of this invention is that the spring is biased to move the float member so that the stopper element is withdrawn from the water outlet when the aircraft is on or near the ground. Thus, with the aircraft approaching the ground or safely landed, the spring holds the float member away from the water outlet, allowing any water in the housing to drain from the housing. With the aircraft in flight, the differential in pressure between the outlet and inlet acts on the float to overcome the bias of the spring, tending to push the stopper element into engagement with the water outlet, sealing the water outlet. When water flows into the housing, filling the space between the float and the housing wall, the buoyant force of the water lifts the float, pulling the stopper element from engagement with the water outlet. The buoyant force of the water must be sufficient to overcome the differential in pressure between the outside atmosphere and cabin pressure. Thus, as the aircraft attains higher altitudes, more water than at lower altitudes is required to fill the housing before the float responds to move the stopper element away from the water outlet.

DESCRIPTION OF THE DRAWING

The preferred embodiment of this invention, illustrating all its features, will now be discussed in detail. This embodiment depicts the novel and non-obvious drain valve of this invention shown in the accompanying drawing, which is for illustrative purposes only. This drawing includes the following FIGS., with like numerals indicating like parts:

FIG. 1 is a perspective view of the aircraft drain valve of this invention.

FIG. 2 is an exploded perspective view of the aircraft drain valve of this invention.

FIG. 3 is a cross-sectional view taken along line 3—3 of FIG. 1.

FIG. 4 is a cross-sectional view of the aircraft drain valve of this invention showing the valve housing partially filled with water, and the float positioned to close the water outlet of the valve.

FIG. 5 is a cross-sectional view taken along line 5—5 of FIG. 3.

FIG. 6 is an enlarged fragmentary view showing the position of the stopper element with respect to the seat of the water outlet.

FIG. 7 is a cross-sectional view similar to that shown in FIG. 4 with the float member moved away from the water outlet to allow water to drain from the valve.

FIG. 8 is a cross-sectional view taken along line 8—8 of FIG. 7.

FIG. 9 is a cross-sectional view taken along line 9—9 of FIG. 4.

FIG. 10 is a cross-sectional view taken along line 10—10 of FIG. 9.

FIG. 11 is a cross-sectional view taken along line 11—11 of FIG. 10.

FIG. 12 is an enlarged fragmentary view showing the spring connecting the housing to the float.

FIG. 13 is a cross-sectional view taken along line 13—13 of FIG. 7.

DESCRIPTION OF THE PREFERRED EMBODIMENT OF THE INVENTION

As best illustrated in FIGS. 1-3, the drain valve 10 of this invention includes a cylindrical housing 12, a cylindrical float 14, and a circular rubber spring 16.

The housing 12 has an upper section 18 and a lower section 20. Both the upper and lower sections 18 and 20 are preferably molded from polymeric material such as, for example, polycarbonate. The upper section 18 has a generally cylindrical configuration with a water inlet 22 at the end of a tubular element 24 extending outwardly from a generally flat top wall 26 of the upper section 18. Surrounding the water inlet 22 in the wall of the tubular element 24 is an annular rim 28 which is adapted to engage an inlet tube 30 (FIGS. 2, 4, and 7) that is slipped over the rim to assist in holding the inlet tube 30 in position. This inlet tube 30 extends, for example, to the drain port of the wash basin (not shown) in the washroom of an aircraft. Thus, the water inlet 22 is in communication with the cabin of the aircraft and is at the same pressure as the pressure in the cabin. On the inside of the upper wall 26 are a pair of stop elements 32 and 34 which limit the upward movement of the float 14. Along the lower end of the cylindrical side wall 36 of the upper section 18 is a recess 38 having a land 40 and shoulder 42 acting as a a stop. Inwardly from the open lower end of the upper section 18 is an annular groove 43 (FIGS. 10 and 12) in the inner surface of the side wall 36.

The lower section 20 of the housing has a water outlet 44 at the end a tubular element 46 which extends outwardly from a generally conical bottom wall 48 in the lower section. The lower section 20 has an overall cylindrical shape with its upper end being open and having a recess 50. The recess 50, similar to recess 38, has a land 52 and shoulder 54 acting as a stop. The tubular element 46 has an annular rim 56 which facilitates grasping and holding an outlet tube 58. This outlet tube 58 extends from the valve 10 and terminates at an exit port (not shown) in the aircraft which is exposed to the atmosphere surrounding the outside of the aircraft. Seated at the mouth of the water outlet 44 is an annular, washer type, seat 60 which, as best illustrated in FIG. 6, has an annular, inner beveled section 62. As best illustrated in FIG. 13, there are four guide members 64 extending inwardly from the side wall 66 of the lower section 20 that are disposed at ninety degrees relative to each other and that prevent the float 14 from moving unduly from side to side.

The float 14 is basically a hollow cylindrical structure which has an annular groove (FIGS. 10 and 12) at the upper end in the side wall 70 and a stopper element 72 at its bottom end. The stopper element 72 has a tapered conical tip 74 which engages the beveled section 62 of the seat 60 when the valve 10 is closed, as depicted in FIG. 4. When the float 14 is positioned in the housing 12, a space 75 is created between the walls of the housing and the float.

The rubber spring 16 is in the form of a wheel like element having an outer ring 76, an inner ring 78, and radial spokes 80 connecting the rings together. The outer ring 76 fits within an internal annular groove 43 in the upper section 18, and the inner ring 78 fits in the annular groove 68 in the float 14. The inner ring 78 moves up and down as the float 14 moves. As illustrated in FIGS. 10 and 12, the spokes stretch with float movement.

As shown in FIG. 2, the valve 10 is easy to assemble. The spring 16 is slipped over the float 14, with the inner ring 78 being stretched outwardly slightly until it is opposite the groove 68, whereupon it contracts and fits snugly within the groove and grasps the float. The float with the spring 16 around it is then placed inside the upper section 18, with the outer ring 76 being placed in the groove 43 in the upper section 18. The open end of upper section 18 is then pushed into the open end of the lower section 20, with the two sections fitting in a telescopic relationship with each other. The lands 40 and 52, respectively of the recesses 38 and 50, slide over each other until the shoulders 42 and 54 abut each other. An adhesive is placed on the lands 40 and 54, or sonic or other welding techniques are employed, to bond securely the upper section 18 to the lower section 20.

In accordance with this invention, the spring 16 is designed so that, with the housing 12 devoid of water and the aircraft on the ground or near the ground, the float 14 is suspended in the housing so that the stopper element 72 is raised off the seat 60 as depicted in FIGS. 5 and 6. Consequently, with the aircraft on the ground, any water in the valve 10 will flow out the outlet 44. When the aircraft gains altitude, the aircraft cabin pressure will be greater than the atmospheric pressure surrounding the aircraft. The pressurized gas within the cabin pushes against the top of the float 14 to overcome the bias of the spring 16 and close the valve 10 by forcing the stopper element 72 to engage the seat 60. Typically, once the plane reaches an altitude of approximately 20,000 feet above sea level, there is sufficient differential in pressure between the cabin pressure and the pressure of the atmosphere surrounding the aircraft for the valve 10 to close. In other words, the pressurized gas in the cabin pushes the float downwardly until the stopper element 72 engages the seat 60, overcoming the bias of the spring. The normal flying altitude of the plane ranges between approximately 20,000 and 50,000 feet, with the typical flying altitude being approximately 35,000 feet. At these altitudes the float 14 responds to the level of water in the space 75 between the walls of the housing 12 and the float 14 to open and close the valve 10.

With the aircraft at its normal flying altitude of approximately 35,000 feet, the value 10 will now open and close as water flows out the housing 12. As shown in FIG. 4, water has entered the housing 12 to fill partially the space 75. The water buoys up the float 14, tending to overcome the force of the differential pressure that caused the valve 10 to close. But the water level in the housing 12 must be sufficiently high for the float 14 to respond and move the stopper element 72 off the seat. As illustrated in FIG. 7, this occurs when the water level has reached the height shown. The float 14 has now moved in response to the buoyant force of the water to a position that lifts stopper element 72 off the seat 60, allowing water to flow from the housing 12 out the outlet 44. When the water level returns to that shown in FIG. 4, the pressure inside the cabin is now sufficient to overcome the biasing force of the spring 16 and the buoyant force of the water to close the valve 10, preventing further flow of the water from the outlet 44. As illustrated in FIG. 12, the spokes 80 stretch and contract as the float 14 moves up and down within the housing 12. The stops 32 and 34 limit the upward movement of the float 14, and the guide members 64 limit the side to side movement of the float. The water level at which the valve 10 will open and close will vary depending upon the altitude of the aircraft. For example, if it is at 20,000 feet, less water will result in the valve 10 opening than at 50,000 feet. This is because the differential pressure between the inlet 22 and outlet 44 will vary depending on the altitude of the aircraft.

When the aircraft is at higher altitudes, for example in excess of about 20,000 feet, the valve 10 is never drained completely of water, being closed by the pressurized gas within the cabin. It is important to close the valve 10 when the aircraft is in normal flight at higher altitudes so that pressure and oxygen from the cabin are not lost. Nevertheless, as the aircraft approaches for a landing, the spring 16 lifts the stopper element 72 off the seat 60, because the differential in pressure between the cabin pressure and atmospheric pressure is minimal. Consequently, any water being discharged through the valve 10 flows through the open valve and exits the aircraft.

SCOPE OF THE INVENTION

The above description discloses the best mode contemplated of carrying out the present invention. This invention is, however, susceptible to modifications and alternate constructions from that discussed above. Consequently, it is not the intention to limit this invention to the particular embodiment disclosed. On the contrary, the intention is to cover all modifications and alternate constructions coming within the scope and spirit of the invention as generally expressed by the following claims:

I claim:

1. In an aircraft having a pressurized cabin and a supply of water that is incrementally and periodically discharged from the aircraft into the outside atmosphere, with the differential in pressure between the cabin pressure and atmospheric pressure increasing as the aircraft attains higher altitudes,
   a valve including:
   a housing having a water inlet and a water outlet, said water inlet being in communication with the cabin and at the same pressure as in the cabin, with water from the supply being discharged flowing into the valve though said water inlet, and said water outlet being in communication with the outside atmosphere,
   a float member retained by a spring means in the form of a rubber, wheel-like member in the housing between the water inlet and water outlet and adapted to move within the housing in response to the aircraft changing altitudes and the water level in the housing,
   said float member having at one end a stopper element which is adapted to engage the water outlet and seal the water outlet so that water entering the housing is retained in the housing,
   said spring means being biased to move the float member towards the water outlet so that the stopper element engages and seals the water outlet when the aircraft has gained a substantial altitude, and away from the water outlet when the aircraft is at or near ground level.

2. The valve of claim 1 wherein there is a space between the float member and the housing, said space being filled with water being incrementally discharged from the aircraft to cause the float to rise when the buoyant force of the water is sufficient to over come the pressure within the cabin and the bias of the spring means.

3. The valve of claim 1 wherein there are guide means in the housing that limit the side to side movement of the float member and stop means that limit the upward movement of the float member.

4. In an aircraft having a pressurized cabin and a supply of water that is incrementally and periodically discharged from the aircraft into the outside atmosphere, with the differential in pressure between the cabin pressure and atmospheric pressure increasing as the aircraft attains higher altitudes,
   a valve including:
   a housing having a cylindrical wall with an annular groove therein, a water inlet, and a water outlet,
   said water inlet and water outlet being aligned with each other and disposed along a central longitudinal axis of the housing, and
   said water inlet being in communication with the cabin and water being discharged and said water outlet being in communication with the outside atmosphere,
   a generally cylindrical float member mounted by spring means in the housing between the water inlet and water outlet and being spaced from the cylindrical wall of the housing and adapted to move within the housing in response to the aircraft changing altitudes and the water level in the housing, and
   a stopper element mounted at an end of the float member near the water outlet, said stopper element being adapted to engage the water outlet and seal the water outlet when the float member moves towards the water outlet so that water entering the housing is retained in the housing,
   said float member having a cylindrical wall with a groove therein generally positioned essentially opposite the groove in the cylindrical wall of the housing when the valve is open and the aircraft is on the ground,
   said spring means being in the form of a wheel-like member having an inner annular ring received in the groove in the cylindrical wall of said float member and grasping the float member, an outer annular ring received in the groove in the cylindrical wall of said housing and grasping the housing, and spoke elements connecting the inner and outer rings, said spoke elements elongating and contracting as the float member moves reciprocally within the housing,
   said spring means being biased to move the float member towards the water outlet so that the stopper element engages and seals the water outlet when the aircraft has gained a substantial altitude, and away from the water outlet when the aircraft is at or near ground level.

5. The valve of claim 4 wherein there is a space between the float member and the housing, said space being filled with water being incrementally discharged from the aircraft to cause the float to rise when the buoyant force of the water is sufficient to over come the pressure within the cabin and the bias of the spring means.

6. The valve of claim 5 wherein there are guide means in the housing that limit the side to side movement of the float member and stop means that limit the upward movement of the float member.

* * * * *